(12) United States Patent
Burns et al.

(10) Patent No.: US 10,756,482 B2
(45) Date of Patent: Aug. 25, 2020

(54) TORQUE-LIMITING COUPLINGS

(71) Applicant: ITT Manufacturing Enterprises LLC, Wilmington, DE (US)

(72) Inventors: Cameron Burns, Foothill Ranch, CA (US); Hung Duc Tran, Rosemead, CA (US); Peter Hyzin, Coto De Caza, CA (US); Le Nguyen, Irvine, CA (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 724 days.

(21) Appl. No.: 15/271,166

(22) Filed: Sep. 20, 2016

(65) Prior Publication Data
US 2018/0083384 A1  Mar. 22, 2018

(51) Int. Cl.
*H01R 13/62* (2006.01)
*G02B 6/38* (2006.01)
*H01R 13/622* (2006.01)
*H01R 13/623* (2006.01)

(52) U.S. Cl.
CPC ......... *H01R 13/622* (2013.01); *G02B 6/3894* (2013.01); *H01R 13/623* (2013.01)

(58) Field of Classification Search
CPC .......... F16D 7/042; F16D 7/044; F16D 7/046; F16D 43/2022; F16D 43/2024; F16D 43/2026; G02B 6/3894; H01R 13/622; H01R 13/623; H01R 13/533;
(Continued)

(56) References Cited

U.S. PATENT DOCUMENTS 1,828,370 A * 10/1931 Huddle ............... F16D 7/044
464/39
2,195,492 A  4/1940 McDonald
2,536,225 A  1/1951 Rice
(Continued)

FOREIGN PATENT DOCUMENTS

CN   202668417   1/2013
EP   2594367 A1 * 5/2013 ............. F16D 7/044
(Continued)

OTHER PUBLICATIONS

International Preliminary Report on Patentability and Written Opinion in PCT Application No. PCT/US2007/069277, dated Nov. 18, 2008 in 7 pages.
(Continued)

*Primary Examiner* — Josh Skroupa
(74) *Attorney, Agent, or Firm* — Knobbe, Martens, Olson & Bear, LLP

(57) ABSTRACT

A coupling can include a barrel that includes a communication pathway, such as an electrical contact or optical pathway. The coupling can include a nut that is configured to engage with a corresponding portion of a mating connector, such as via a threaded connection. When the coupling and the mating connector are engaged, the nut secures the coupling and the mating connector together, and respective termination elements of the coupling and the mating connector are in communication with each other. The coupling can include a torque-limiting mechanism. The torque-limiting mechanism can be configured to enable the transmission of torque up to a limit amount, and to inhibit or prevent the transmission of torque above the limit amount.

16 Claims, 14 Drawing Sheets

(58) Field of Classification Search
CPC ........... H01R 13/639; Y10T 403/32598; Y10T 403/556; Y10T 403/56
USPC ......... 403/118, 296, 299; 464/38, 39, 43, 44
See application file for complete search history.

(56) References Cited

U.S. PATENT DOCUMENTS

| | | | |
|---|---|---|---|
| 2,576,069 A * | 11/1951 | Hoag | B25B 23/141 |
| | | | 464/38 |
| 2,728,895 A * | 12/1955 | Quackenbush | F16L 37/1215 |
| | | | 285/81 |
| 3,068,667 A * | 12/1962 | Sussman | F16D 7/044 |
| | | | 464/39 |
| 3,334,661 A | 8/1967 | Milette | |
| 3,517,371 A | 6/1970 | Buckley | |
| 3,669,472 A | 6/1972 | Nadsady | |
| 3,834,252 A | 9/1974 | Abell | |
| 3,917,373 A | 11/1975 | Peterson | |
| 3,942,337 A * | 3/1976 | Leonard | F16D 7/044 |
| | | | 464/36 |
| 4,030,798 A | 6/1977 | Paoli | |
| 4,062,203 A | 12/1977 | Leonard et al. | |
| 4,176,582 A | 12/1979 | Witte | |
| 4,239,314 A | 12/1980 | Anderson et al. | |
| 4,359,254 A | 11/1982 | Gallusser et al. | |
| 4,458,565 A | 7/1984 | Zilly et al. | |
| 4,536,048 A | 8/1985 | Schildkraut et al. | |
| 4,548,458 A | 10/1985 | Gallusser et al. | |
| 4,610,339 A | 9/1986 | Ciolli | |
| 4,726,782 A | 2/1988 | Hager et al. | |
| 4,808,117 A | 2/1989 | Gale et al. | |
| 4,808,123 A | 2/1989 | Dee et al. | |
| 4,820,184 A | 4/1989 | Brandes | |
| 4,878,695 A | 11/1989 | Whitham | |
| 4,928,202 A | 5/1990 | Gale et al. | |
| 5,137,087 A | 8/1992 | Szarka et al. | |
| 5,200,575 A | 4/1993 | Sheehan | |
| 5,399,096 A | 3/1995 | Quillet et al. | |
| 5,580,278 A | 12/1996 | Fowler et al. | |
| 5,588,496 A | 12/1996 | Elger | |
| 5,702,263 A | 12/1997 | Baumann et al. | |
| 5,786,976 A | 7/1998 | Field | |
| 5,897,277 A | 4/1999 | Barre et al. | |
| 5,957,716 A | 9/1999 | Buckley et al. | |
| 5,959,828 A | 9/1999 | Lewis et al. | |
| 6,086,400 A | 7/2000 | Fowler | |
| 6,123,563 A | 9/2000 | Johnson et al. | |
| 6,135,800 A | 10/2000 | Majors | |
| 6,152,753 A | 11/2000 | Johnson et al. | |
| 6,162,095 A * | 12/2000 | Holman | H01R 13/622 |
| | | | 439/607.59 |
| 6,183,293 B1 | 2/2001 | Kieninger | |
| 6,499,358 B1 | 12/2002 | Hogan et al. | |
| 7,503,443 B1 | 3/2009 | Dobras | |
| 7,625,226 B1 | 12/2009 | Gastineau | |
| 7,650,821 B2 | 1/2010 | Gauthier et al. | |
| 7,780,386 B2 | 8/2010 | Lau et al. | |
| 8,235,741 B2 * | 8/2012 | Schulze | H01R 13/622 |
| | | | 439/339 |
| 8,365,641 B2 | 2/2013 | Daglow | |
| 8,430,868 B2 | 4/2013 | Edgell et al. | |
| 8,602,899 B2 | 12/2013 | You | |
| 8,714,056 B2 | 5/2014 | Landowski | |
| 8,808,095 B2 * | 8/2014 | Cheng | F16D 7/044 |
| | | | 464/39 |
| 9,046,134 B2 * | 6/2015 | Johnson | F16D 7/044 |
| 9,099,807 B2 * | 8/2015 | Opgenorth | H01R 13/622 |
| 9,106,012 B2 | 8/2015 | Gross, III | |
| 2012/0103144 A1 | 5/2012 | Gauthier et al. | |
| 2014/0227901 A1 | 8/2014 | Mosier et al. | |
| 2014/0334894 A1 | 11/2014 | Marchand et al. | |

FOREIGN PATENT DOCUMENTS

| | | | |
|---|---|---|---|
| EP | 2 940 361 | 11/2015 | |
| FR | 1486914 A * | 6/1967 | ............ F16D 7/044 |
| FR | 2 728 731 | 6/1996 | |
| FR | 2 758 286 | 7/1998 | |
| GB | 710538 A * | 6/1954 | ............ F16D 7/044 |
| GB | 2 477 627 | 8/2011 | |

OTHER PUBLICATIONS

Extended European Search Report in Patent Application No. 17189585.7, dated Jul. 19, 2018 in 9 pages.
Extended European Search Report in Patent Application No. 17189585.7, dated Jul. 2, 2019 in 18 pages.
Partial European Search Report in Patent Application No. 17189585.7, dated Mar. 6, 2019 in 16 pages.

* cited by examiner

TORQUE-LIMITING COUPLINGS

BACKGROUND

Field

This disclosure relates to couplings, such as couplings that are configured to limit the amount of torque applied to one or more components of the coupling during engagement with a mating connector.

Description of Certain Related Art

Couplings are devices that connect one circuit segment with another. For example, an electrical coupling can connect, and provide electrical communication between, first and second electrical circuit segments. Some couplings are connected to mating connectors by applying a torque to engage corresponding threads on the coupling and the mating connectors. However, applying too much torque can damage the coupling and the mating connectors.

SUMMARY OF CERTAIN FEATURES

Various embodiments of torque-limiting couplings are described below. The coupling can include a barrel that houses a connection element, such as an electrical contact or optical termination. The coupling can include a proximal end and a distal end, each of which can connect with a mating connector, such as a mating electrical or optical connector. The coupling can provide communication between the mated connectors. In some embodiments, one of the ends of the coupling comprises a male securing element and the other end of the coupling comprises a female securing element, such as one end having a male threaded connection and the other end having a female threaded connection.

The coupling can include a torque-limiting mechanism. The torque-limiting mechanism can be configured to enable the transmission of torque up to a limit amount, and to inhibit or prevent the transmission of torque above the limit amount. For example, during engagement of the coupling with the mating coupling, the user can apply torque to a sleeve on the coupling, which can transmit the torque to a nut on the coupling. This can threadably engage the nut with a corresponding threaded portion of the mating connector, thereby tightening the connection between the coupling and the mating connector. When the amount of torque applied via the sleeve reaches a limit amount, the torque-limiting mechanism engages, which inhibits or prevents further torque from being transferred to the nut, and thus further tightening of the connection. This can reduce the chance of damage to the coupling and/or the mating connector due to over-torquing and/or can decrease the chance of the coupling and mating connector becoming stuck together or unreasonably difficult to decouple. In some embodiments, the torque-limiting mechanism can provide an indication to the user, such as an audible and/or tactile signal that the maximum and/or a certain level of torque has been reached.

As described in more detail below, the torque-limiting mechanism can comprise a ratcheting mechanism. In some embodiments, the ratcheting mechanism includes a set of angled ratchet teeth and a protrusion (e.g., a pawl or cog) that engages with the teeth. For example, the nut can include the teeth and a sleeve that engages with the nut can include the projection. The ratcheting mechanism can be configured to limit the transmission of torque in a first rotational direction, such as in the direction of engaging (e.g., tightening) the connection between the coupling and the mating connector. In some implementations, the ratcheting mechanism can be configured to permit the transmission of torque in a second rotational direction, such as in the direction of disengaging (e.g., loosening) the connection. In some variants, the ratcheting mechanism does not limit the transmission of torque in the second direction.

In certain implementations, the coupling is configured to enable a user to disengage the torque-limiting mechanism. For example, in some embodiments, the sleeve can be moved (e.g., axially) to disengage the ratcheting mechanism. For example, the axial movement can remove the protrusion from engagement with the angled ratchet teeth. Certain embodiments are configured to engage a secondary rotation mechanism, such as a second set of teeth. The secondary rotation mechanism can be configured to facilitate disengagement (e.g., loosening) of the connection between the coupling and the mating coupling. In some implementations, engagement of the secondary rotation mechanism can occur in response to, and/or concurrently with, the axial movement of the sleeve and/or disengagement of the ratcheting mechanism.

As mentioned above, the coupling can be configured to provide an indication to a user. For example, the coupling can comprise a clicker assembly that provides an audible alert, such as a clicking sound. The clicker assembly can include interlocking teeth that slip (e.g., move) relative to each other when more than a limit amount of torque is applied to the nut. For example, the clicker assembly can include a first ring with a first set of teeth and a second ring with a second set of teeth that engage with the first set of teeth. In some embodiments, the first and second rings are identical. Certain embodiments include a friction disk that facilitates movement of one portion of the clicker relative to another portion of the clicker assembly, such as the first ring moving relative to the second ring and/or other portions of the coupling.

Some variants of the coupling include a first rotation-regulating mechanism and a second rotation-regulating mechanism, such as a friction-regulating device and a ratcheting device. In some embodiments, the friction-regulating device includes a disk that engages with the sleeve. In certain implementations, the ratcheting device includes a spring-biased catch member, such as a ball, and a plurality of angled teeth. The ratcheting device can be configured such that the catch member moves relative to (e.g., slides up and over) the angled teeth when a limit amount of torque is reached during engagement of the coupling and the mating connector, thereby limiting the amount of torque that can be applied by a user. In some embodiments, the ratcheting device is configured such that the catch member does not move relative to the angled teeth during disengagement of the coupling and the mating connector.

Neither the preceding summary, nor the following detailed description, nor the associated drawings purport to limit or define the scope of protection. The scope of protection is defined by the claims.

BRIEF DESCRIPTION OF THE DRAWINGS

Certain features, aspects, and advantages of the subject matter disclosed herein are described below with reference to the drawings, which are intended to illustrate, and not to limit, the scope of the disclosure. Various features of different disclosed embodiments can be combined to form additional embodiments, which are part of this disclosure. No structures, features, steps, or processes are essential or critical; any can be omitted.

DETAILED DESCRIPTION OF CERTAIN EMBODIMENTS

Figure 1:
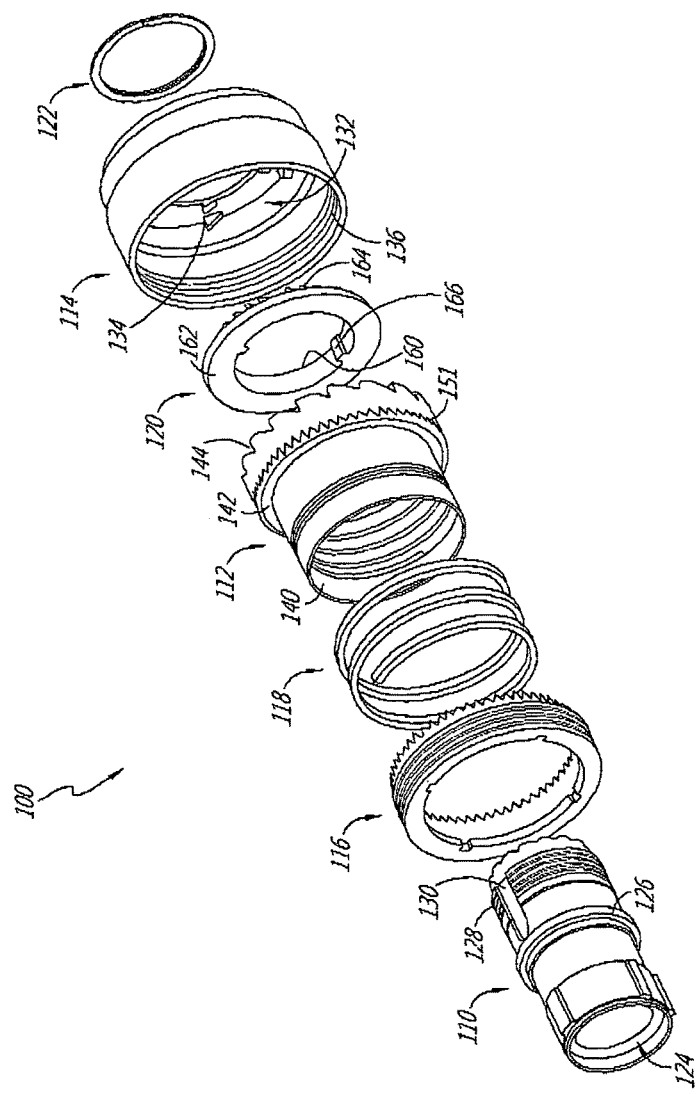
FIG. 1 illustrates an exploded perspective view of an embodiment of a coupling.

Various improved couplings are disclosed herein. The disclosed embodiments are described in the context of an electrical coupling, due to particular utility in that context. However, the inventions disclosed herein can also be applied to other types of coupling devices and in other contexts, such as pneumatic couplings, optical (e.g., fiber optic) coupling, hydraulic couplings, and otherwise. Furthermore, although various embodiments are disclosed in connection with couplings that link with two or more mating connectors, the inventions disclosed herein can also be used on devices that connect with only one mating connector. For example, the inventions can be incorporated in a connector that engages with a mating connector to provide communication between two electric or optical cables.

I. Cammed Engagement Features

FIGS. 1-7 illustrate an embodiment of a coupling 100. The coupling 100 can include a proximal end and a distal end, each of which can connect with a mating connector, such as a mating electrical connector. As illustrated, the coupling 100 can include a barrel 110, coupling nut 112, and coupling sleeve 114. As described in more detail below, the coupling nut 112 can be engaged with a retention element, such as a retention ring 116. The retention ring 116 and coupling nut 112 can be biased apart by a biasing member 118, such as a spring. In some embodiments, the coupling 100 includes a positioning member 120. The coupling 100 can include a retainer 122, such as a retaining ring.

As illustrated in FIG. 1, the barrel 110 can comprise a generally hollow member. The barrel 110 can have an inner cavity 124, which can house one or more connections (not shown). The connections can be configured to engage with corresponding connections on the connectors that are mated with the proximal and distal ends of the coupling 100. This can enable the connections of the coupling 100 to provide a communication pathway (e.g., electrical or optical) between the mated connectors. In some embodiments, the communication pathway comprises one or more metal conductors (e.g., copper wires) for electrical communication and/or one or more fiber optic cables for optical communication. The communication pathway can be located in the inner cavity 124 and can extend between proximal and distal ends of the barrel 110. The connections can comprise male and/or female engagement portions, such as pins and/or recesses that engage corresponding recesses and/or pins in the mating connectors. In some embodiments, the barrel 110 has a retention element, such as a radially-outwardly extending projection or a shoulder 126. As shown, the distal end of the barrel 110 can include a connection element, such as threads 128, which can facilitate connecting the distal end of the coupling 100 with mating threads on a distal mating connector. In certain variants, the barrel 110 includes an alignment feature, such as a track 130.

Figure 2:
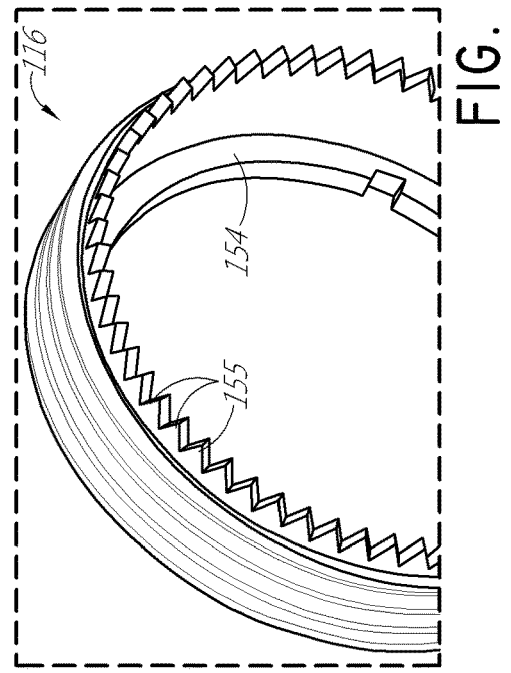
FIG. 2 illustrates a partial perspective view of a coupling sleeve of the coupling of FIG. 1.

As shown in FIGS. 1 and 2, the coupling sleeve 114 can comprise a generally hollow member, such as a hollow cylindrical member. The coupling sleeve 114 can include an inner chamber 132 configured to receive portions of one or more other components of the coupling 100. For example, the inner chamber can include an opening that receives a portion of the barrel 110 and the coupling nut 112.

An inner surface of the coupling sleeve 114 can include torque-limiting engagement features, such as engagement teeth 134. The teeth 134 can be positioned on an inside distal end of the coupling sleeve 114. As shown, the teeth 134 can be positioned on a radially inwardly extending shoulder 133. The teeth 134 can include a cammed surface 135 positioned at an angle α. The angle α can be at least about: 20°, 30°, 40°, 50°, 60°, 70°, angles between the aforementioned angles, or other angles. As illustrated, the teeth can have a shape that is similar to a sawtooth wave. As will be described in further detail below, the teeth 134 can be configured to engage with a mating feature of the coupling nut 112 to facilitate torque-limited rotational movement of the coupling nut 112 relative to the barrel 110 and/or the coupling sleeve 114.

As illustrated, the coupling sleeve 114 can include a connection element, such as threads 136. The threads 136 can be positioned on an inside surface of the coupling sleeve 114. The threads 136 on the coupling sleeve 114 can interface with corresponding threads on the retention ring 116 to connect the coupling sleeve 114 with the retention ring 116.

The coupling nut 112 can comprise a hollow member, such as a hollow cylindrical member. The coupling nut 112 can include an opening that receives a portion of the barrel 110. The coupling nut 112 can include connection features, such as threads 140 on an inner surface of a proximal end. The threads 140 can enable the coupling 100 to threadably connect with a proximal mating connector. An outer surface of the coupling nut 112 can include a support feature, such as a shoulder 142. The support feature can provide a surface against which a distal end of the biasing member 118 is compressed.

Figure 3:
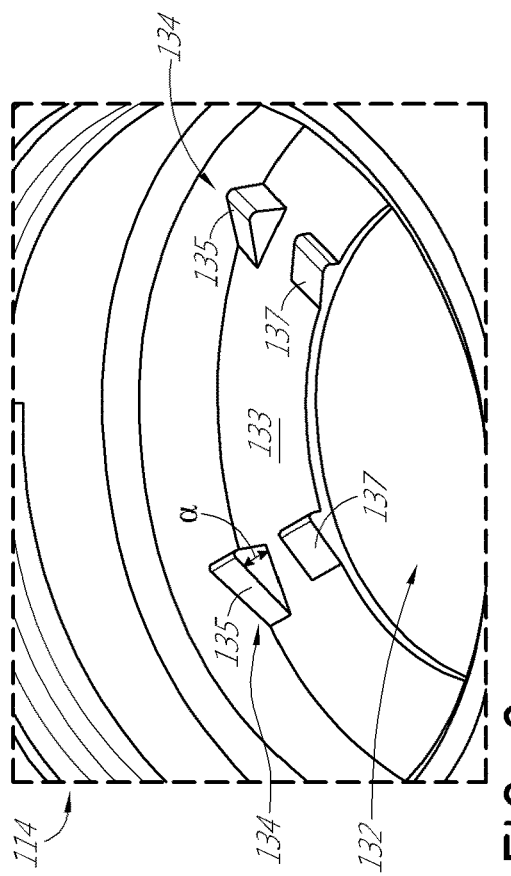
FIG. 3 illustrates a partial perspective view of a coupling nut of the coupling sleeve of FIG. 1.

As shown in FIGS. 1 and 3, the coupling nut 112 can include torque-limiting engagement features, such as engagement teeth 144. The teeth can extend distally and/or be positioned on the distal end of the coupling nut 112. In some variants, the teeth are on the distal-most end of the coupling nut 112. The teeth can include a cammed first surface 146. The first surface can be positioned at an angle β relative to the circumferential axis C1 of the coupling nut 112. The angle can be at least about: 20°, 30°, 40°, 50°, 60°, 70°, angles between the aforementioned angles, or other angles. In some embodiments, the teeth 144 can include a second surface 148, which can be generally parallel with the circumferential axis a and/or can comprise the distal-most portion of the teeth. In some embodiments, the teeth 144 include a third surface 150, which can be generally perpendicular to the circumferential axis a of the coupling nut 112. In some variants, relative to the circumferential axis C1, the third surface is at an angle γ, which is greater than or equal to about 80° and/or less than or equal to about 100°.

In some embodiments, the coupling nut 112 includes disengagement features, such as disengagement teeth 151. As illustrated, the disengagement teeth 151 can be positioned adjacent to the shoulder 142 and/or can extend proximally. In some embodiments, the disengagement teeth 151 are generally triangular and/or have a shape similar to a triangle wave. As shown in FIG. 3, the teeth 151 can be positioned at an angle δ and/or an angle Δ relative to the circumferential axis C2 of the coupling nut 112. The angles δ and/or Δ can be acute angles, such as less than or equal to about: 45°, 50°, 60°, 70°, 80°, angles between the aforementioned angles, or other angles. In some embodiments, the angles δ and/or Δ are about equal.

Figure 4:
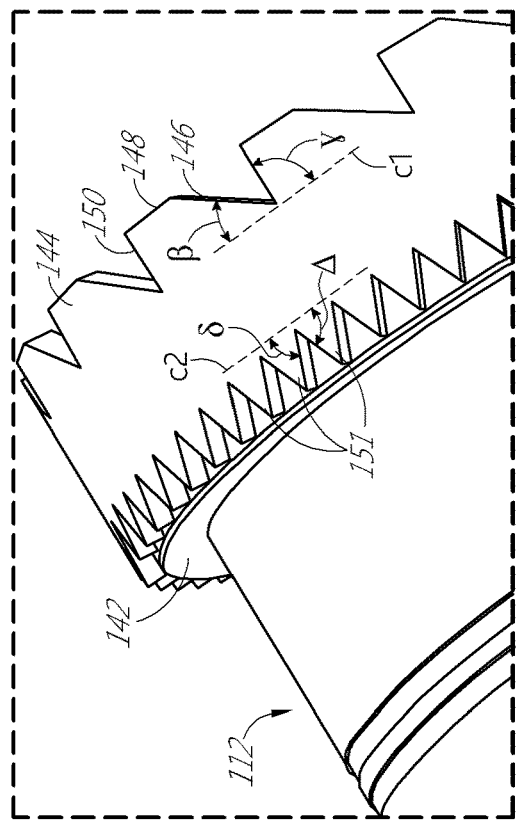
FIG. 4 illustrates a partial perspective view of a retention ring of the coupling sleeve of FIG. 1.

As illustrated in FIGS. 1 and 4, the coupling 100 can include the retention ring 116. The retention ring 116 can be configured to connect with the coupling sleeve 114. For example, as shown in FIG. 4, an outer surface of the retention ring 116 can include threads 152 that are configured to interface with the threads 136 on the coupling sleeve 114. In certain implementations, the retention ring 116 includes a support feature. For example, the retention ring 116 can include a radially inwardly extending shoulder 154. In some embodiments, support feature of the retention ring 116 can provide a surface against which a proximal end of the biasing member 118 is compressed.

In some embodiments, the retention ring 116 includes disengagement features, such as disengagement teeth 155. As illustrated, the disengagement teeth 155 can extend distally. In some embodiments, the teeth are triangular and/or shaped as a triangle wave. The teeth 155 can be at angles, such as the angles δ, Δ discussed above. As will be discussed in more detail below, the disengagement teeth 155 of the retention ring 116 can be configured to engage with the disengagement teeth 151 of the coupling nut 112 to facilitate disengagement of the coupling 100.

With reference back to FIG. 1, as mentioned above, the coupling 100 can include the biasing member 118. A variety of biasing members 118 may be employed. For example, the biasing member 118 can comprise a wave spring, helical coil spring, leaf spring, or otherwise. In the coupling 100, the biasing member 118 may be axially positioned between the retention ring 116 and the coupling nut 112, so as to bias the retention ring 116 and the coupling nut 112 apart.

The coupling 100 can include a positioning member 120, such as a positioning ring. The positioning member 120 can include an axially extending portion, such as a distally extending hollow sleeve 160, and/or a radially extending portion, such as a radially outwardly extending shoulder 162. In some implementations, a distal-facing surface of the radial portion includes incrementing members, such as teeth 164. In some embodiments, the positioning member 120 includes an alignment feature, such as a radially inwardly extending tooth 166. The alignment feature of the positioning member 120 can matingly engage with the alignment feature of the barrel 110. For example, the tooth 166 can be configured to be received in the track 128 of the barrel 110. This can inhibit or prevent the positioning member and/or other certain components of the coupling 100 from rotating relative to the barrel 110.

Figure 5:
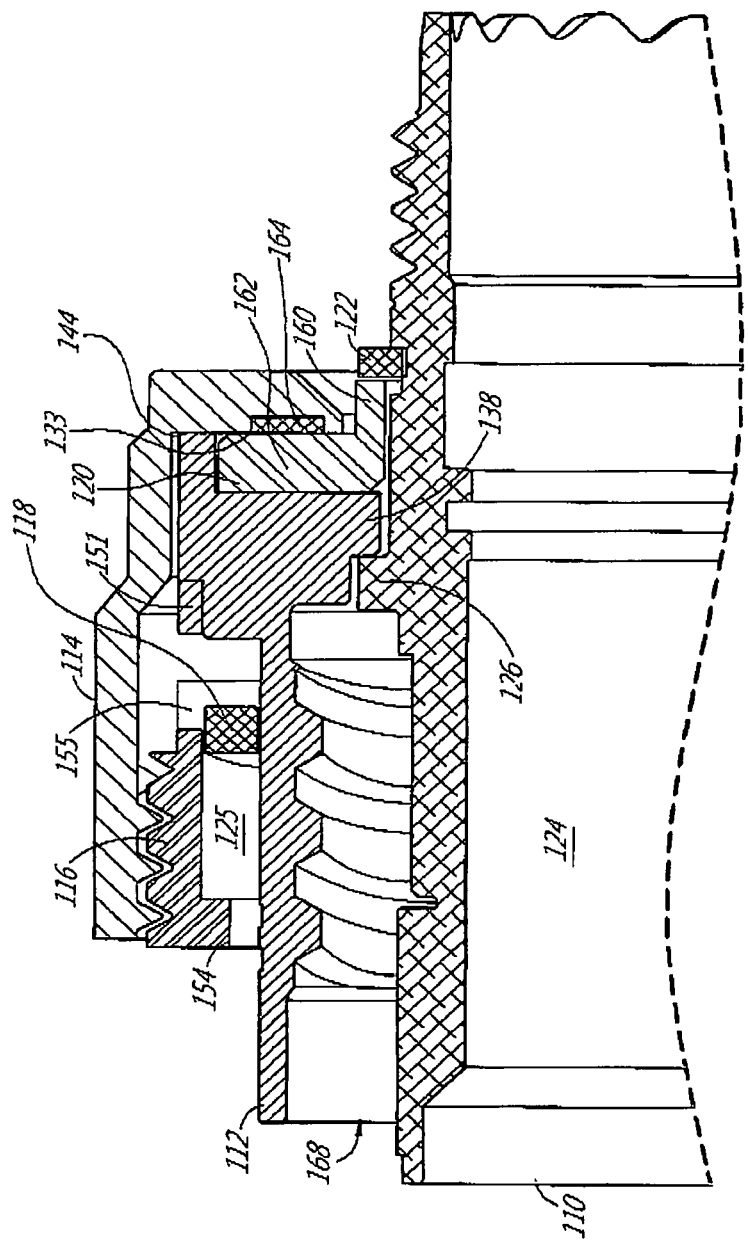
FIG. 5 illustrates a side cross-sectional view of a portion of the coupling of FIG. 1 during an engagement operation.

FIG. 5 illustrates a cross-sectional side view of the coupling 100 in an assembled state. During assembly, the coupling nut 112 can be installed onto the barrel 110, such that an inner portion 138 (e.g., a radially inwardly extending shoulder) of the coupling nut 112 can be secured against the shoulder 126 of the barrel 110. The positioning member 120 can be inserted against the coupling nut 112, such that a proximal-facing surface of the radial portion 162 of the positioning member 120 is engaged with a distal-facing surface of the coupling nut 112.

The coupling sleeve 114 can be installed over the coupling nut 112 and/or the positioning member 120. In some embodiments, the shoulder 133 of the coupling sleeve 114 is engaged with a distal-facing surface of the radial portion 162 of the positioning member 120. This can enable the teeth 164 of the positioning member 120 to engage with the shoulder 133. For example, in some variants, the teeth 164 of the positioning member 120 can engage teeth 137 on the shoulder 133. The teeth 137 can be radially inward of and/or smaller than the teeth 134. In some embodiments, the coupling sleeve 114 and the coupling nut 112 are rotated (e.g., clockwise) as a unit during the engagement. During this operation, the coupling sleeve 114 and the coupling nut 112 can rotate relative to the positioning member 120, which can be held generally stationary. For example, an interference between the tooth 166 of the positioning member 120 in the track 130 of the barrel 110 can maintain the positioning member 120 in a generally stationary rotational position. In some implementations, the rotation of the coupling sleeve 114 relative to the positioning member 120 can cause the teeth 137 on the shoulder 133 of the coupling sleeve 114 to interact with the teeth 164 of the positioning member 120. For example, the teeth 137, 164 can engage and disengage. The interaction of the teeth 137, 164 can provide an alert, which can indicate to a user that the connector is being engaged. The alert can be an audible alert (e.g., a ratcheting sound), a tactile alert (e.g., a vibration or axial movement of the coupling sleeve 114 relative to the coupling nut 112), or otherwise.

In various implementations, the teeth 134 of the coupling sleeve 114 engage with (e.g., abut against) the teeth 144 of the coupling nut 112. For example, the teeth 134 of the coupling sleeve 114 can be received in gaps between the teeth 144 of the coupling nut 112 and vice versa. The engagement of the teeth 134, 144 can facilitate providing torque-limited rotation, as will be discussed in more detail below. In some embodiments, the engagement of the teeth 134, 144 is increased by the biasing member 118 biasing the teeth 144 against the teeth 134.

In some variants, after the coupling sleeve 114 is installed, the retainer 122 is installed. For example, a retaining ring can be installed into a groove in the barrel 110. As illustrated, the retainer 122 can engage with the hollow sleeve 160 of the positioning member 120. In some embodiments, the coupling nut 112 is physically constrained along the longitudinal axis of the coupling 100, such as between the shoulder 126 and the retainer 122. In certain variants, the coupling nut 112 is configured to rotate but not to translate relative to the barrel 110.

In certain implementations, the biasing member 118 is installed in an opposite direction compared to the direction that the coupling nut 112 and/or coupling sleeve 114 was installed. The biasing member 118 can be installed over the coupling nut 112 such that a distal end of the biasing member 118 engages with the shoulder 142 of the coupling nut 112. The retention ring 116 can be installed over the biasing member 118. As shown, the biasing member 118 can be received in a channel 125 of the retention ring 116. The retention ring 116 can be threadably coupled with the coupling sleeve 114, which can compress the biasing member 118 between the shoulder 154 of the retention ring 116 and the shoulder 142 of the coupling nut 112. This can bias the retention ring 116 and the coupling nut 112 apart and/or longitudinally separate the teeth 151, 155 from each other.

During an engagement operation, the coupling 100 can be engaged with a proximal mating connector and a distal mating connector. This can include receiving a portion of the proximal mating connector in a space 168 between the coupling nut 112 and the barrel 110. The engagement can interface the connections of the coupling 100 with corresponding connections of the mating connectors. In various embodiments, the engagement includes threadably connecting the coupling 100 with the mating connector. In some embodiments, to achieve the threaded connection with the proximal mating connector, a user rotates the coupling sleeve 114 (e.g., in a clockwise direction) during the engagement operation.

Figure 6:
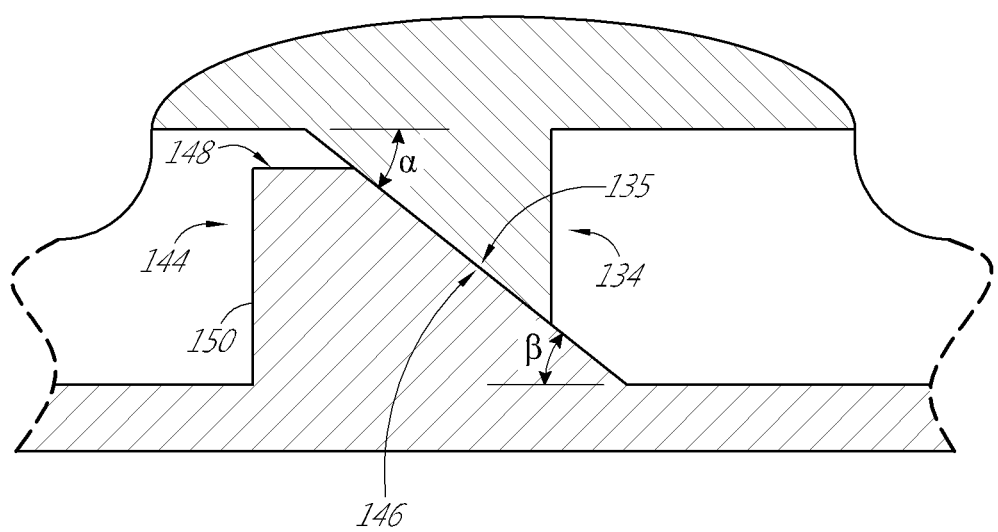
FIG. 6 illustrates a close-up view of mating teeth of the coupling sleeve and coupling nut of the coupling of FIG. 1.

As mentioned above, the teeth 134 on the coupling sleeve 114 can engage with the corresponding teeth 144 in the coupling nut 112. An example of such engagement is shown in FIG. 6. As illustrated, the angled surface of the teeth 144 of the coupling nut 112 engages (e.g., abuts against) the angled surface of the teeth 134 of the coupling sleeve 114, thereby providing a frictional connection between the coupling nut 112 and coupling sleeve 114. During the engagement operation, the frictional connection between the teeth 134, 144 can enable the rotational motion of the coupling sleeve 114 to be transferred to the coupling nut 112 to achieve rotation of the coupling nut 112 relative to the barrel 110 and/or the mating connector.

As the rotation continues, and the coupling nut 112 engages further with the mating connector, the amount of torque required to further turn the coupling nut 112 typically increases. Eventually, the amount of torque required to further turn the coupling nut 112 can overcome the frictional engagement between the teeth 134, 144. This can result in the teeth 134 of the coupling sleeve 114 sliding up the angle surfaces 146 of the teeth 144 of the coupling nut 112. This can result in the coupling sleeve 114 being axially moved away from the coupling nut 112 and/or against the biasing force of the biasing member 118. In various embodiments, the overcoming of the frictional engagement between the teeth 134, 144 enables the coupling sleeve to rotate relative to the coupling nut 112.

With continued sliding of the teeth 134 of the coupling sleeve 114 along the teeth 144 of the coupling nut 112, the teeth 134 can reach the apex of the teeth 144. For example, the teeth 134 can slide along the second surface 148. In various embodiments, upon reaching the third surface 150, each of teeth 134 can fall back down (e.g., under the bias of the biasing member 118) into engagement with the first angled surface 146 of an adjacent one of the teeth 144. Continued rotation of the coupling sleeve 114 in the tightening direction can repeat the process of the teeth 134 moving up the teeth 144 and falling back down into engagement with a circumferentially adjacent one of the teeth 144. Thus, the coupling 100 can provide torque limited ratcheting rotation of the coupling nut 112.

Figure 7:
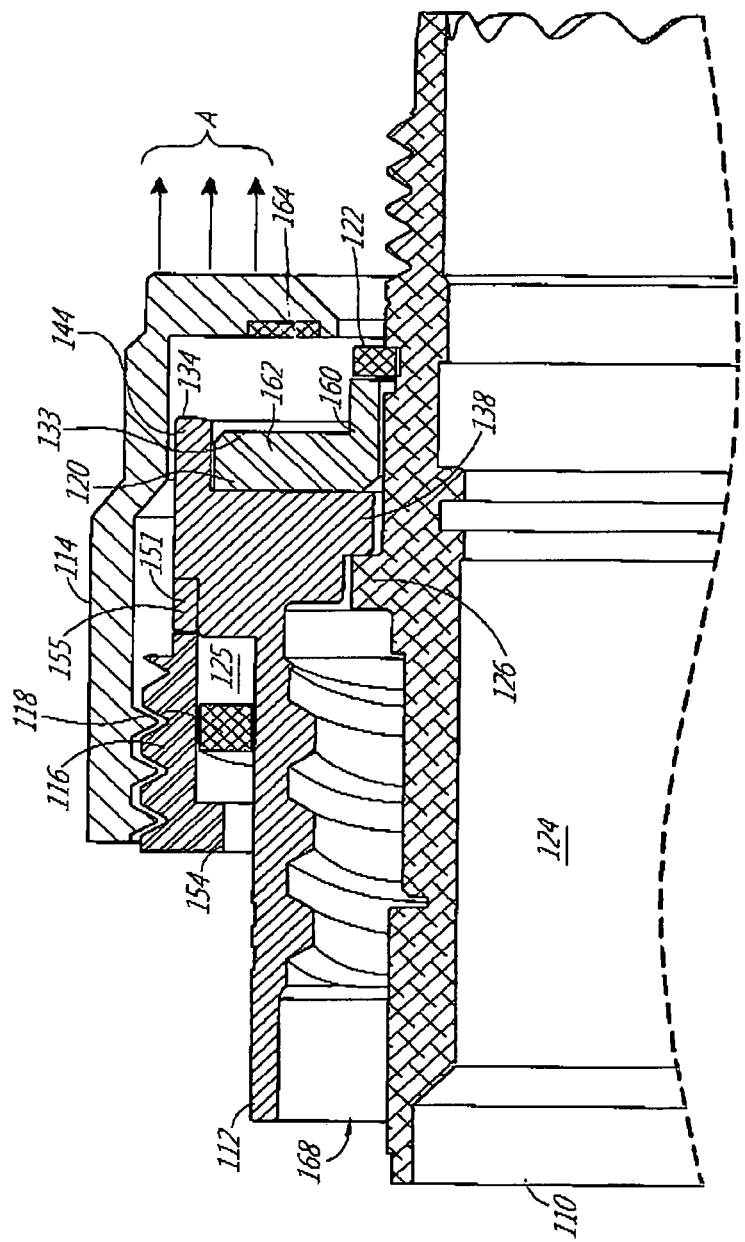
FIG. 7 illustrates a side cross-sectional view of a portion of the coupling of FIG. 1 during an engagement operation.

In certain embodiments, to disengage the connector 100, the coupling sleeve 114 is moved longitudinally, such as in the direction of the arrows A to the position shown in FIG. 7. For example, in some variants, a user can pull the coupling sleeve 114 distally relative to the coupling nut 112 and/or against the bias of the biasing member 118. In some embodiments, the distal movement of the coupling sleeve 114 can disengage the engagement teeth 134, 144. For example, the engagement teeth 134, 144 can be longitudinally spaced apart. As illustrated, the distal movement of the coupling sleeve 114 can engage the disengagement teeth 151 of the coupling nut 112 with the disengagement teeth 155 of the retention ring 116. With the sleeve in the distally displaced position, and/or the disengagement teeth 151, 155 engaged, the coupling sleeve 114 can be turned (e.g., counterclockwise), thereby turning the coupling nut 112 in a similar direction to disengage the coupling nut 112 from the mated connector.

II. Clicker Engagement Features

Figure 8:
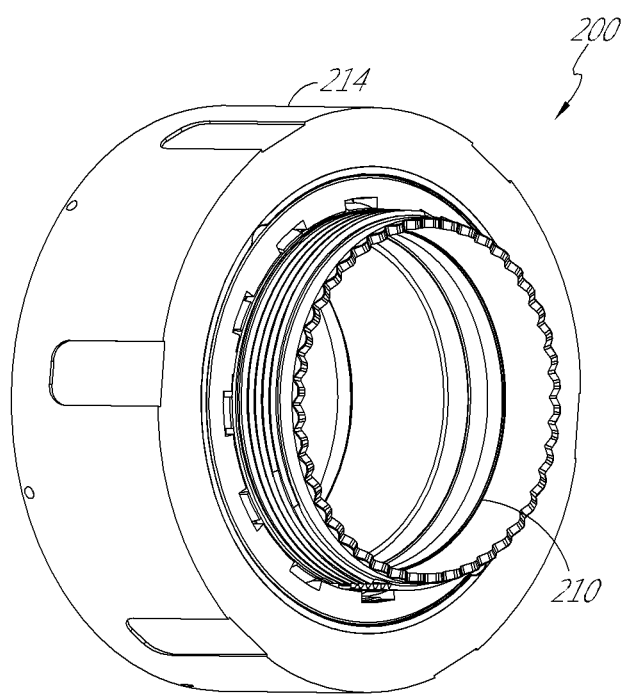
FIG. 8 illustrates a perspective view of an embodiment of another coupling.
Figure 9:
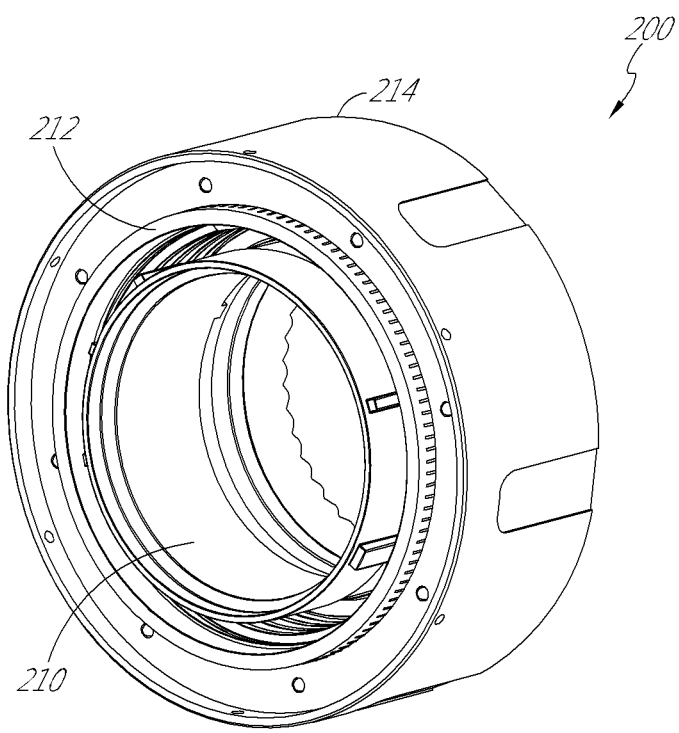
FIG. 9 illustrates another perspective view of the coupling of FIG. 8.

FIGS. 8-14 illustrate another embodiment of a coupling 200. The coupling 200 is similar or identical to the coupling 100 discussed above in many respects. Accordingly, numerals used to identify features of the coupling 200 are incremented by a factor of one hundred to identify certain similar features of the coupling 200. For example, as shown in FIGS. 8 and 9, the coupling 200 can include a barrel 210, coupling nut 212, and coupling sleeve 214, which can be respectively similar to the barrel 110, coupling nut 112 and coupling sleeve 114 described in connection with the coupling 100 above. The coupling 200 can include any one, or any combination, of the features of the coupling 100.

Figure 10:
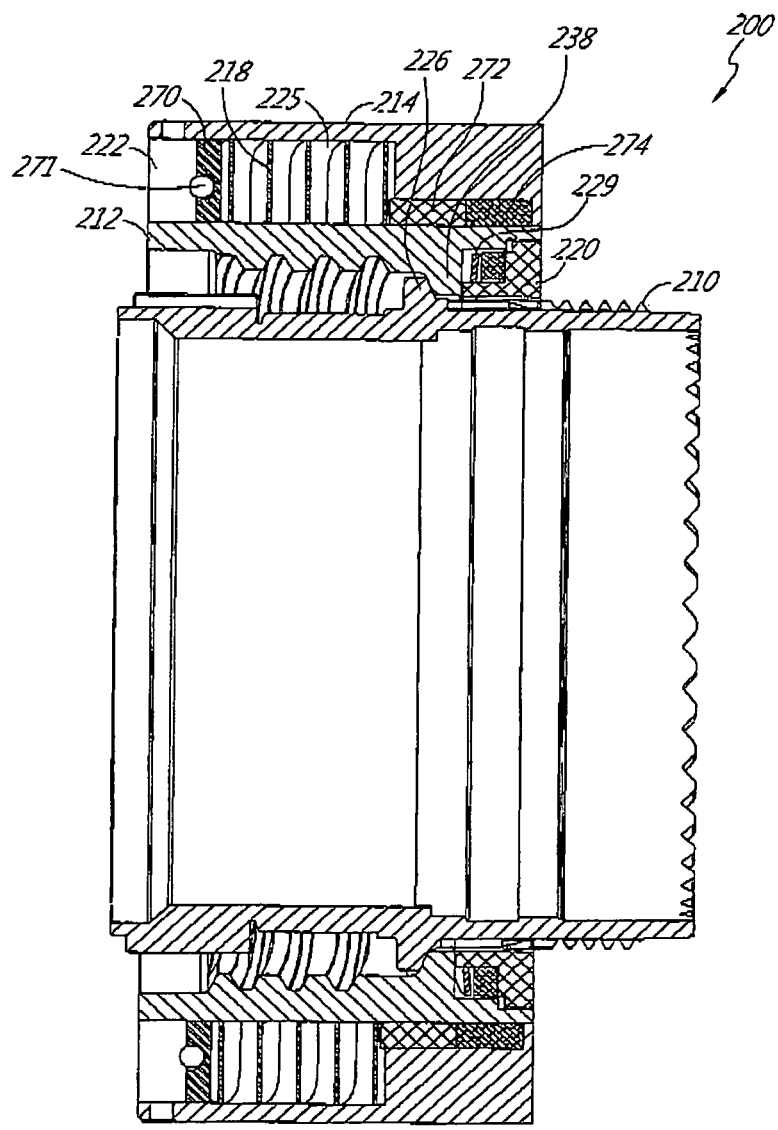
FIG. 10 illustrates a side cross-sectional view of the coupling of FIG. 8.
Figure 11:
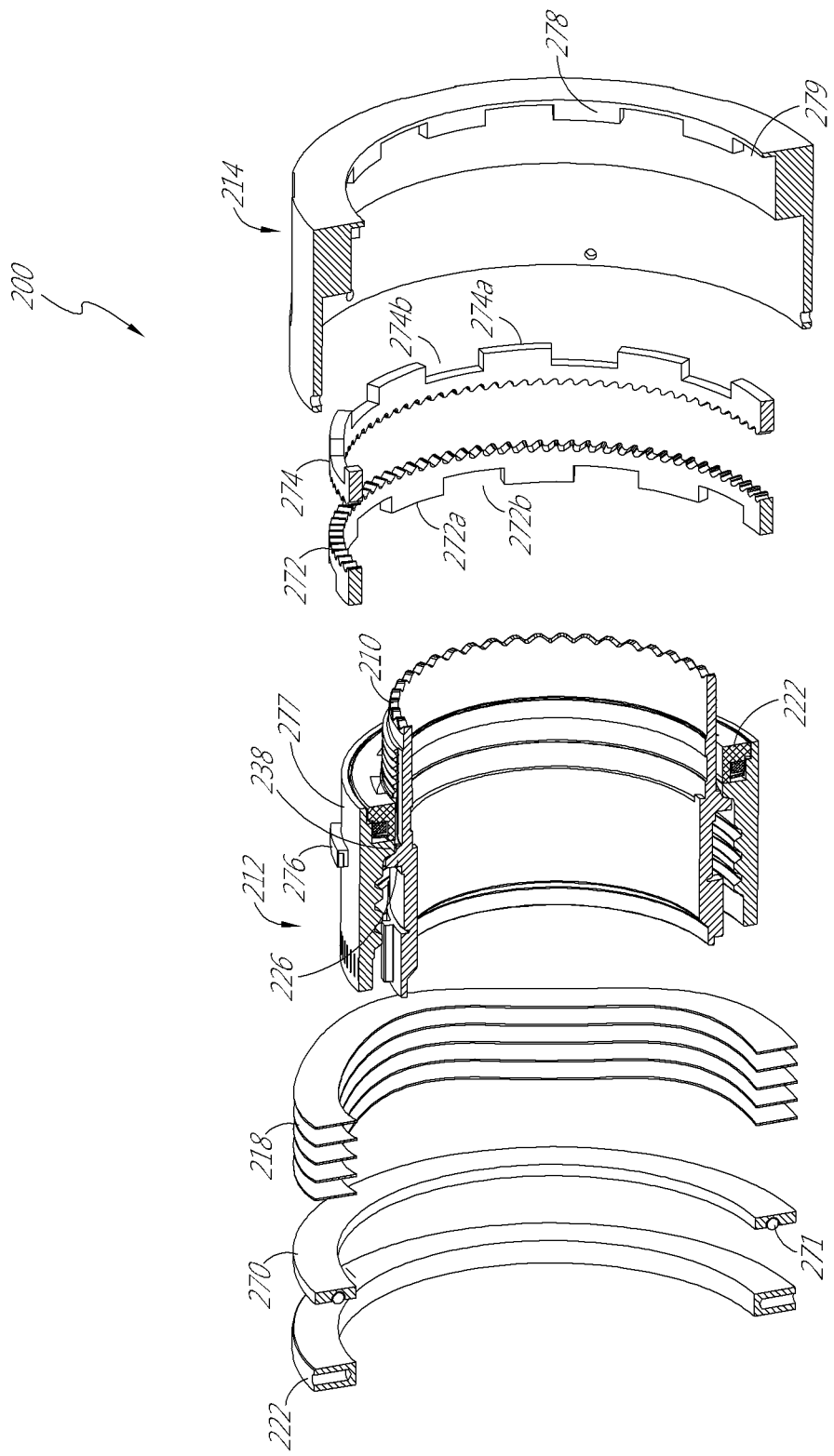
FIG. 11 illustrates an exploded perspective cross-sectional view of the coupling of FIG. 8.

As illustrated in FIGS. 10 and 11, the coupling nut 212 can be engaged with the barrel 210. For example, the coupling nut 212 can receive a portion of the barrel 210. In some embodiments, the coupling nut 212 is secured with a positioning member 220. In some embodiments, the positioning member 220 comprises a securing feature, such as a retaining ring that seats in a groove in an inner wall of the coupling nut 212 and/or in an outer wall of the barrel 210. In certain variants, the positioning member 220 comprises an annular component with a threaded inner surface that can interface with threads on an outer surface of the barrel 210. The positioning member 220 can secure an inner portion (e.g., a shoulder 238) of the coupling nut 212 axially between a shoulder 226 on the barrel 210 and the retention member. Thus, the coupling nut 212 can be inhibited or prevented from moving longitudinally relative to the barrel 210. In some embodiments, the positioning member 220 is biased with a biasing member 229, such as with a spring positioned between the positioning member 220 and the shoulder 238. The biasing member 229 can press the shoulders 226, 238 against each other.

As illustrated, the coupling 200 can include a biasing member 218, such as a spring. In the embodiment illustrated, the biasing member 218 comprises a wave spring, though other types of biasing members are contemplated. The biasing member 218 can be received in a channel 225 of the coupling sleeve 214, such that the biasing member 218 is located radially between the coupling sleeve 214 and the coupling nut 212. As described in further detail below, the biasing member 218 can be configured to bias one or more components of the coupling 200 into engagement, which can facilitate providing ratcheting and/or notification functionality.

In certain implementations, the biasing member 218 is retained by a retainer 222, such as a retaining ring. As shown in FIG. 10, the retainer 222 can be positioned in the channel 225 in the coupling sleeve 214. In some embodiments, the retainer 222 comprises a spiral retaining ring, e-clip, c-clip, or other type of retaining ring. In certain implementations, the retainer 222 is configured to be received in an inner surface of the coupling sleeve 214. In some variants, the retainer 222 is configured to be connected with threads on the inner surface of the coupling sleeve 214. In certain embodiments, the retainer 222 is fixedly connected to the coupling sleeve 214, such as with one or more set screws. In some implementations, the retainer 222 is attached to the coupling sleeve 214 and/or not attached to the coupling nut 212. In some embodiments, the retainer 222 and the coupling sleeve 214 are configured to move (e.g., rotate) as a unit. In certain variants, there is a small clearance (e.g., a radial space) between the retainer 222 and the coupling nut 212. In some embodiments, the retainer 222 and the coupling nut 212 are configured to move (e.g., rotate) relative to each other.

As illustrated in FIG. 11, the coupling 200 can include a friction regulator, such as a friction reducer disk 270. The friction reducer disk 270 can be positioned between the retainer 222 and the biasing member 218. In certain embodiments, this can facilitate rotation of the biasing member 218 relative to the retainer 222, such as during engagement or disengagement of the coupling 200 with a mating connector 200. In various embodiments, the friction disk can be annular in shape. The disk 270 can be configured to reduce friction between the biasing member 218 and the retainer 222. In some embodiments, friction between the biasing member 218 and the retainer 222 is always present and/or is caused by the biasing member 218 pushing axially on the first clicker ring 272 and/or a projection 276. Compared to an embodiment without the disk 270, certain embodiments that include the disk 270 can reduce the amount of friction by at least about: 50%, 25%, 10%, 5%, values between the aforementioned values, or other values. In an embodiment without the disk 270, the measured torque was about 130 lbf-in (14.7 N·m). The disk 270 can be made of various materials, such as stainless steel or high-performance polymers. The disk 270 can have a very low coefficient of friction. Some embodiments have a coefficient of friction that is less than or equal to about: 0.20, 0.10, 0.08, 0.06, 0.04, values between the aforementioned values, or other values.

In some embodiments, the friction reducer disk 270 can receive one or more rotation facilitating members, such as rollers 271. In certain implementations, the rollers 271 are spherical or cylindrical in shape. For example, the rollers 271 can comprise spherical ball bearings. As illustrated, the rollers 271 can protrude from a surface of the friction reducer disk 270. For example, the rollers 271 can protrude from a proximal surface and/or a distal surface of the friction reducer disk 270. In certain implementations, the rollers 271 are a different material than the friction reducer disk 270, such as one being plastic and the other metal. In some embodiments, the rollers 271 engage with the biasing member 218 and/or retainer 222. For example, the rollers 271 can be configured to roll along the retainer 222. The rollers 271 can be configured to facilitate rotation of the friction reducer disk 270 and/or biasing member 218 and/or first clicker ring 272 relative to the retainer 222. In certain implementations, the retainer 222 includes a circumferential channel that receives the rollers 271.

Figure 12:
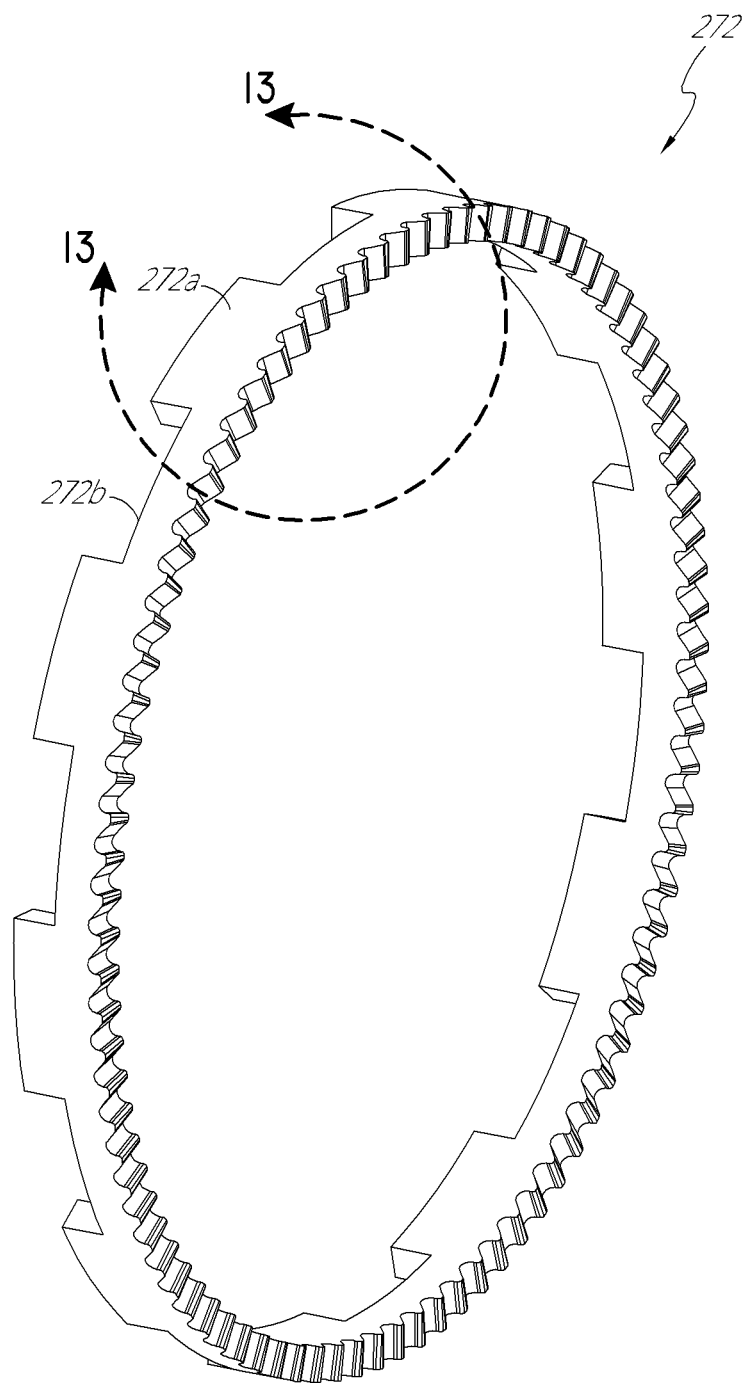
FIG. 12 illustrates a perspective view of a clicker ring of the coupling of FIG. 8.
Figure 13:
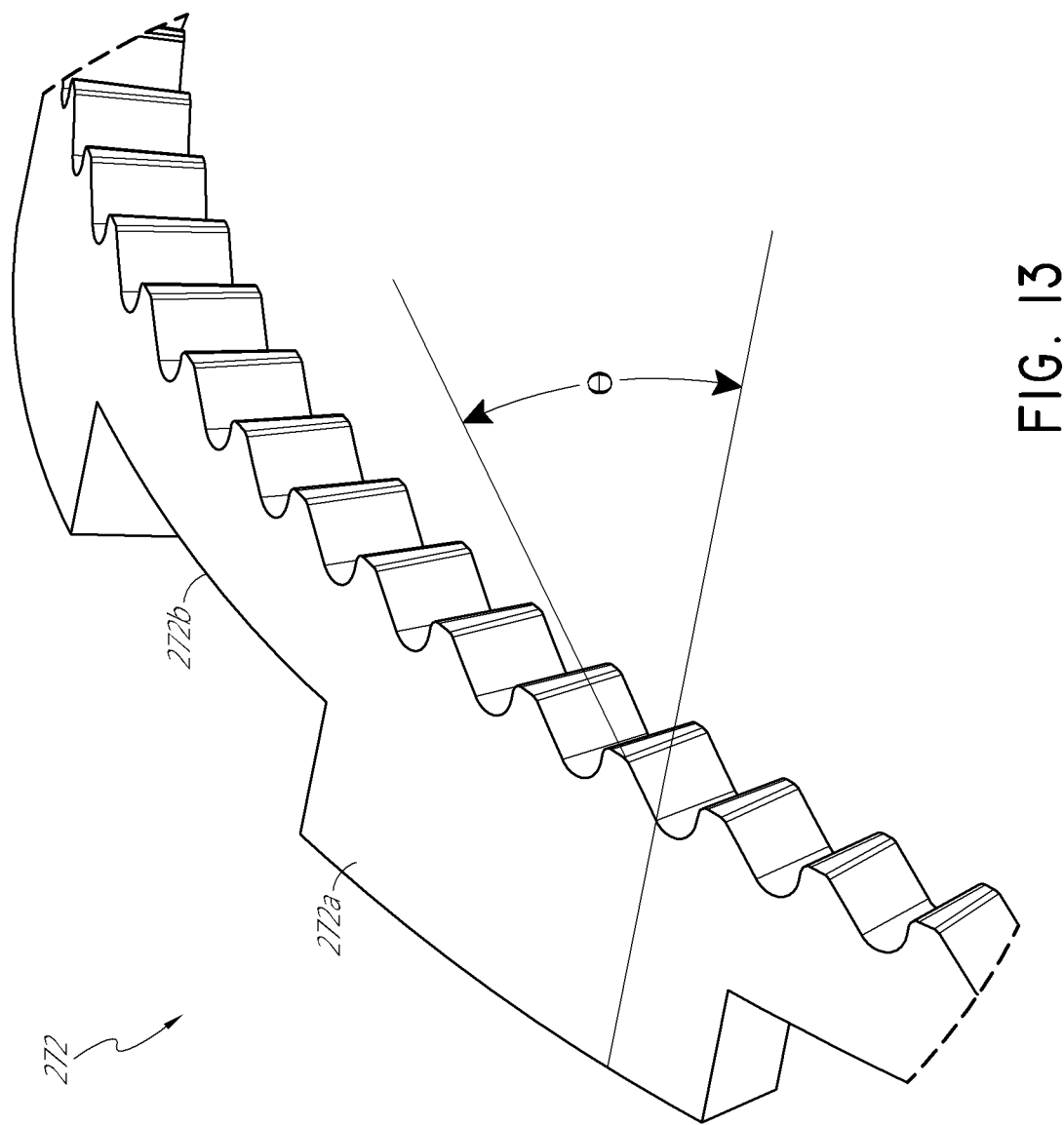
FIG. 13 illustrates a close-up view of a portion of the clicker ring of FIG. 12.
Figure 14:
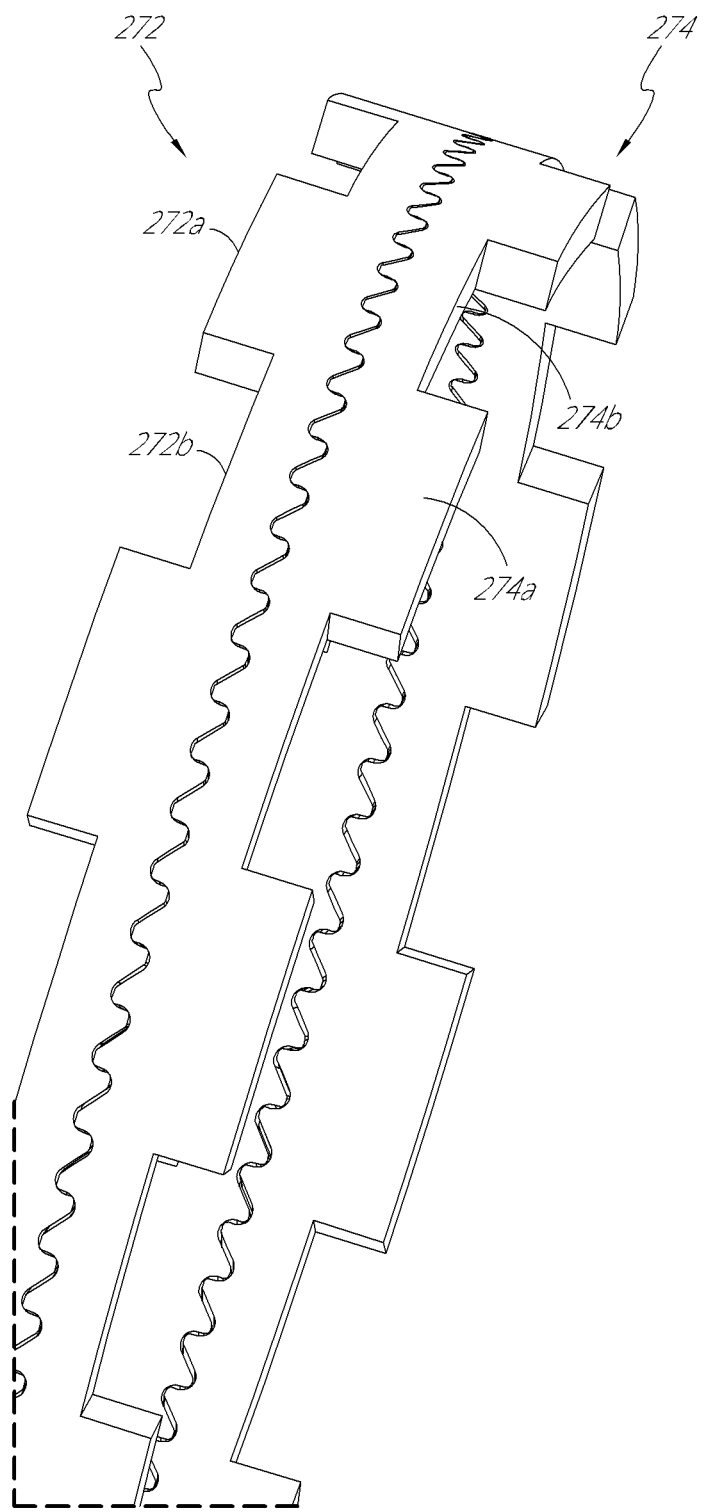
FIG. 14 illustrates a perspective view of a portion of the engaged clicker rings of the coupling of FIG. 8.

As mentioned above, the coupling 200 can be configured to provide ratcheting and/or notification functionality. For example, the coupling 200 can include mating features configured to ratchet and/or emit an audible or tactile signal. As illustrated in FIGS. 11 and 12, the coupling 200 can include a first clicker ring 272 and second clicker ring 274. The clicker rings 272, 274 can each include a plurality of engagement members, such as a plurality of teeth. The teeth can include a cammed surface positioned at an angle $\theta$, as shown in FIG. 13. The angle $\theta$ can be at least about: 20°, 30°, 40°, 50°, 60°, 70°, angles between the aforementioned angles, or other angles. The teeth on the first clicker ring 272 are on a distal end of the ring 272, and the teeth on the second clicker ring 274 on a proximal end of the ring 274. In the coupling 200, these pluralities of teeth engage together. For example, the teeth of the first clicker ring 272 can be received in gaps between the teeth of the second clicker ring 274 and vice versa, such as is shown in FIG. 14. In various embodiments, the cammed surfaces of the clicker rings 272, 274 are in frictional engagement with each other. In certain embodiments, the biasing member 218 biases the clicker rings 272, 274 together, such as by pushing the first clicker ring 272 against the second clicker ring 274.

In some embodiments, the first and second clicker rings 272, 274 are identical. This can, for example, reduce the number of unique components of the coupling 200, ease manufacturing, reduce cost, etc. As shown, in some variants, the second clicker ring 274 is flipped (e.g., about 180°) compared to the first clicker ring 272. In certain implementations, at least the teeth of the first and second clicker rings 272, 274 are identical. In some variants, the first and second clicker rings 272, 274 are not identical.

With reference back to FIG. 11, the first clicker ring 272 can be configured to connect with the coupling nut 212. For example, the ring 272 can include one or more projections 272a and recesses 272b. In some embodiments, the recess 272b of the first clicker ring 272 can receive a corresponding projection 276 on the outer surface of the coupling nut 212. In some embodiments, the outer surface of the coupling nut 212 has a receiving feature (e.g., an opening 277 between circumferentially adjacent projections 276) that is configured to receive the projection 272a of the first clicker ring 272. The engagement between the recess 272b of the first clicker ring 272 and the projection 276 of the first coupling nut 212 and/or the projection 272a of the first clicker ring 272 with the opening 277 of the first coupling nut 212 can provide a physical interference between the first clicker ring 272 and the coupling nut 212 in the circumferential direction. This can inhibit or prevent relative rotational movement of the coupling nut 212 and the first clicker ring 272. In some embodiments, the first clicker ring 272 and the coupling nut 212 are rotationally secured together such that they rotate as a unit.

In some embodiments, the second clicker ring 274 includes coupling sleeve engagement features, such one or more projections 274a and recesses 274b. In some embodiments, the recess 274b of the second clicker ring 274 receives a projection 278 on an inner surface of the sleeve 214. In some embodiments, the projection 274a of the second clicker ring 274 is received in an opening 279 in the sleeve 214. Such engagement between the projection 274a of the second clicker ring 274 and opening 279 of the sleeve 214 and/or recess 274b of the second clicker ring 274 and projection 278 of the sleeve can inhibit relative rotation of the second clicker ring 274 and the sleeve 214. In some embodiments, the second clicker ring 274 and the sleeve 214 are rotationally coupled together such that they rotate as a unit.

During engagement of the coupling 200 with a mating connector, the coupling sleeve 214 can be rotated by a user. The rotation of the coupling sleeve 214 can be transferred to the second clicker ring 274, such as through the mating projection 274a and opening 279 and/or the mating recess 274b and projection 278. The engagement between the teeth of the clicker rings 272, 274, such as is shown in FIG. 14, can transfer the rotation to the first clicker ring 272. The rotation can be transferred from the first clicker ring 272 to the coupling nut 212, such as through the mating projection 272a and opening 277 and/or the mating recess 272b and projection 276. Thus, the coupling nut 212 can be rotated to engage with the mating connector.

In some embodiments, rotation of the coupling nut 212 also rotates the biasing member 218. Such rotation can be facilitated by the friction reducer disk 270. For example, in comparison to the amount of friction that would occur if the biasing member 218 were abutted directly against the retainer 222, the inclusion of the friction reducer disk 270 between the retainer 222 and the biasing member 218 can reduce the amount of friction such as by reducing the amount of friction by at least about 50%.

With continued rotation of the coupling sleeve 214 and continued engagement between the coupling nut 212 and the mating connector, the amount of torque required to rotate the coupling nut 212 can increase. As the torque increases beyond a certain amount, the frictional engagement of the teeth of the first and second clicker rings 272, 274 can be overcome. This can result in the teeth of the second clicker ring 274 sliding along (e.g., riding up and falling down) the teeth of the first clicker ring 272, thus allowing the second clicker ring 274 to rotate relative to the first clicker ring 272. In some embodiments, the ability of the teeth of the clicker rings 272, 274 to move relative to each other based on an amount of friction being overcome provides a limit to the amount of torque that the user can apply to the coupling nut 212 via the coupling sleeve 214. For example, for torques above a limit amount, the teeth of the first and second clicker rings 272, 274 slide relative to each other, thereby inhibiting or preventing further torque from being applied to the coupling nut 212.

In some embodiments, the relative movement of the teeth of the first and second clicker rings 272, 274 provides an audible notification, such as a snap or click. This can alert the user that the maximum and/or recommended limit of the torque that can be applied to achieve the connection has been reached. For example, when the teeth of the second clicker ring 274 move (e.g., ride up and fall down) relative to the teeth of the first clicker ring 272, an audible noise can be created. In some embodiments, the relative movement of the rings 272, 274 produces a vibration or other tactile sensation that can be detected by a user who is grasping the couple sleeve 214.

III. Friction Ring Engagement Features

Figure 15:
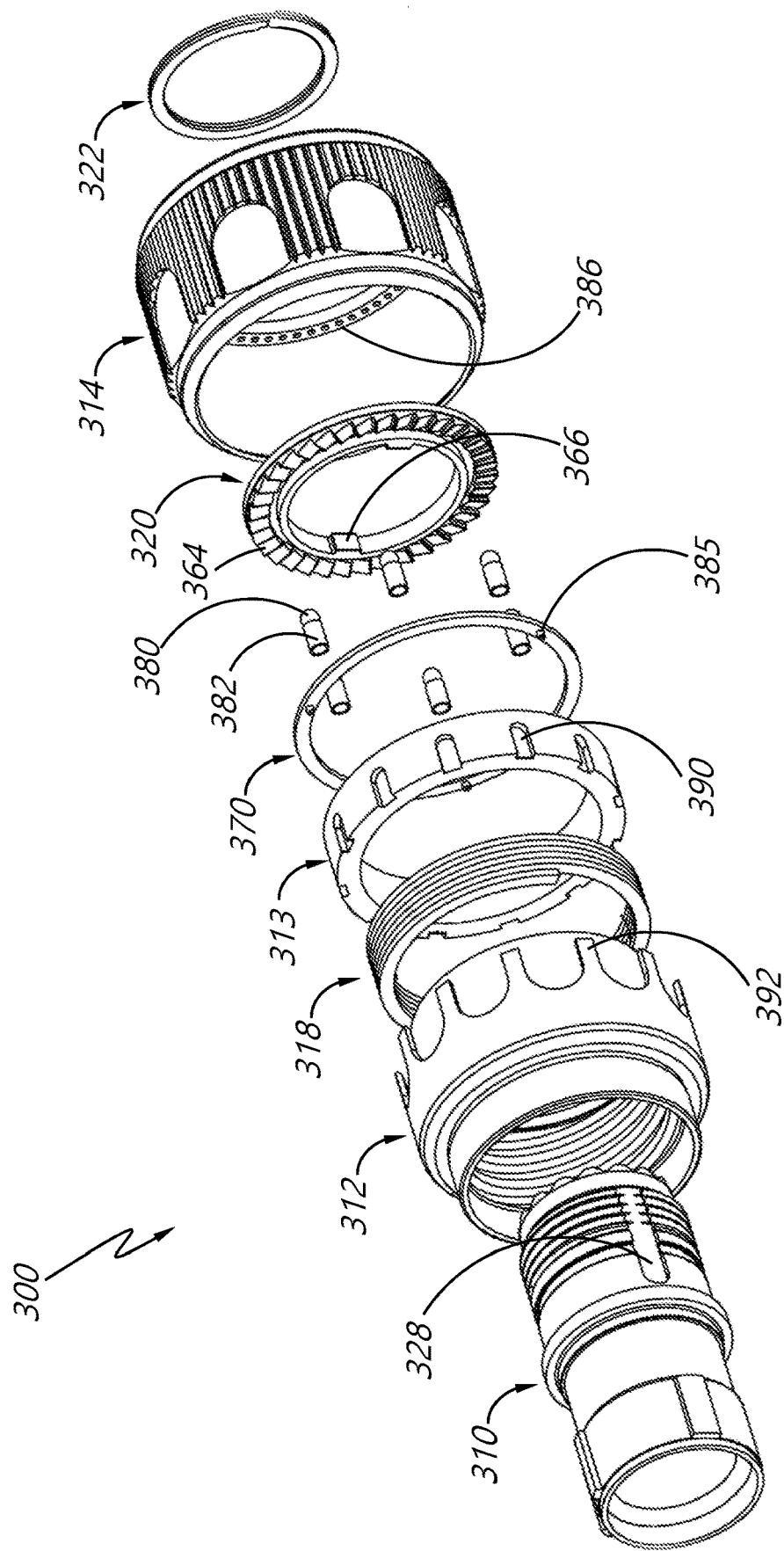
FIG. 15 illustrates an exploded perspective view of an embodiment of another coupling.
Figure 16:
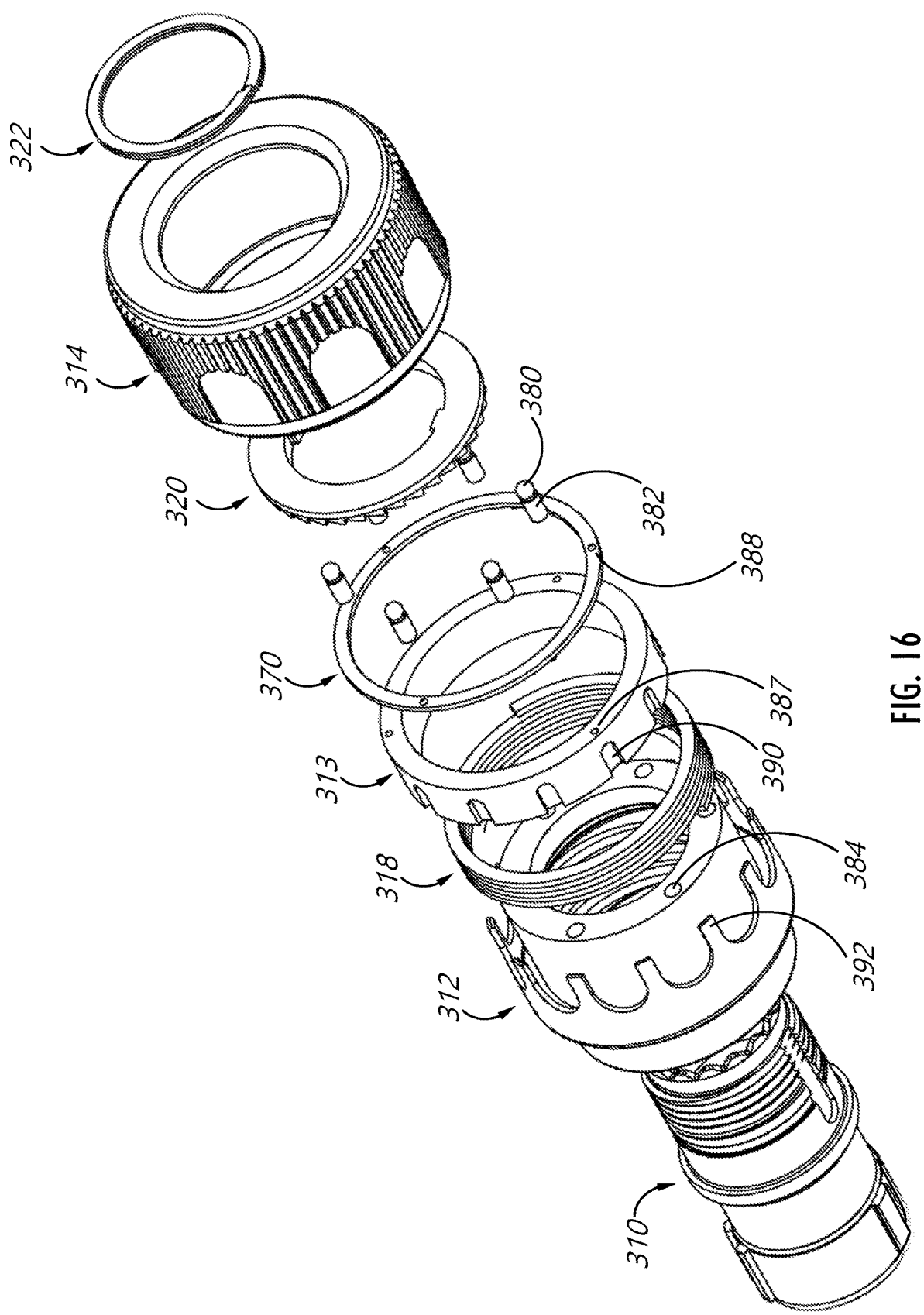
FIG. 16 illustrates another exploded perspective view of the coupling of FIG. 15.
Figure 17:
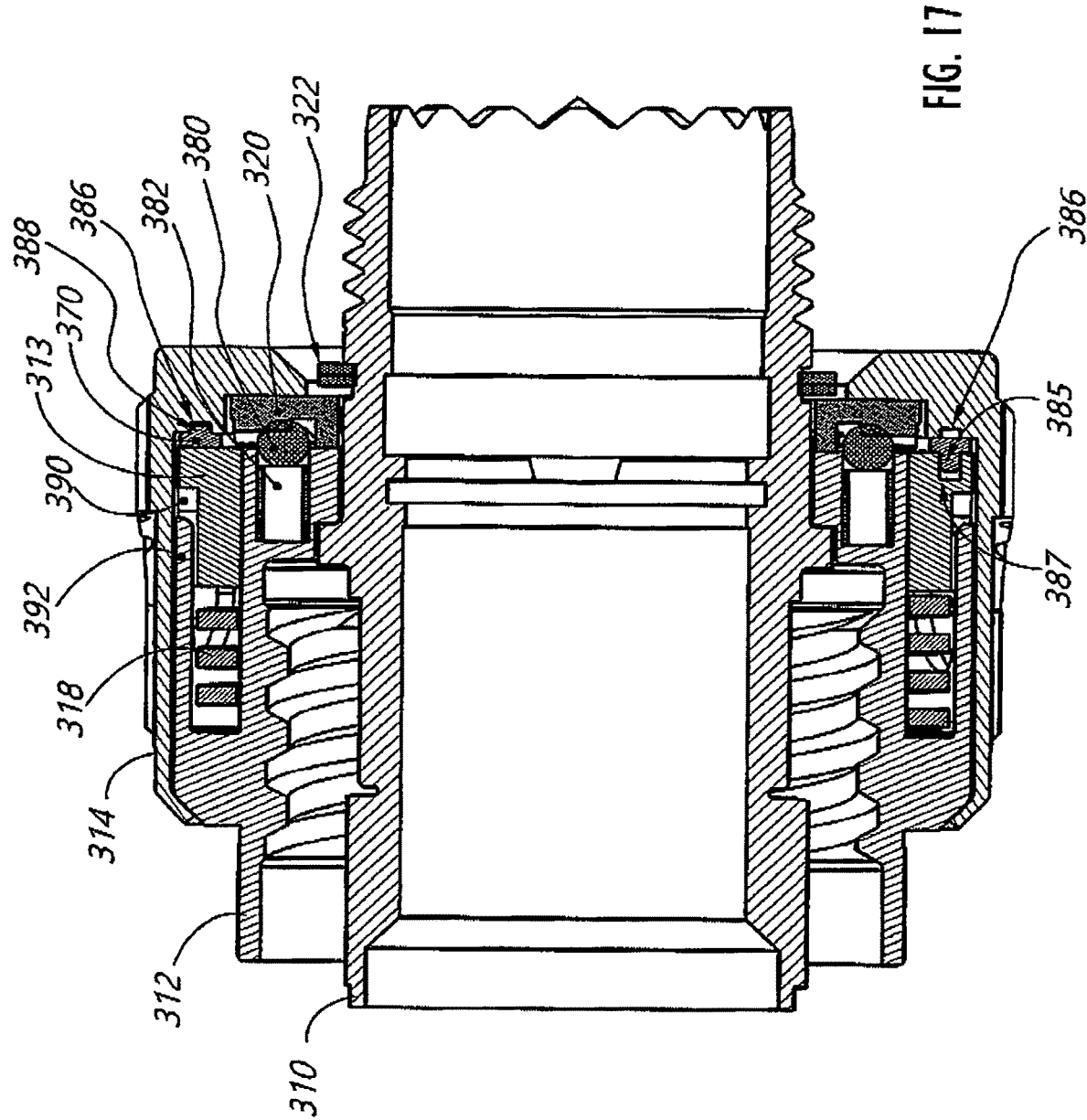
FIG. 17 illustrates a side cross-sectional view of the coupling of FIG. 15.

FIGS. 15-17 illustrate a further embodiment of a coupling 300. The coupling 300 is similar or identical to the couplings 100, 200 discussed above in many respects. For example, the coupling 300 can include a barrel 310, coupling nut 312, and coupling sleeve 314. The coupling 300 can include any one, or any combination, of the features described above.

The coupling 300 can include a torque-transmitting feature, such as a transmission sleeve 313. The transmission sleeve 313 can be connected with and/or restrained by the coupling sleeve 314. For example, as shown, a distal end of the coupling sleeve 314 can include a physical interference (e.g., a radially inwardly extending portion) that inhibits or prevents distal movement of the transmission sleeve 313. As also shown, a proximal end of the coupling sleeve 314 can include a physical interference (e.g., a radially inwardly extending portion) that inhibits or prevents proximal movement of the transmission sleeve 313. For example, the proximal end of the coupling sleeve 314 can be swaged inwardly or held by the retaining ring or similar components (not shown). In some embodiments, the transmission sleeve 313 is threadably connected to the coupling sleeve 314. As will be discussed in more detail below, the transmission sleeve 313 and the coupling sleeve 314 can be configured to rotate as a unit up to a torque limit and to rotate relative to each other above the torque limit. The transmission sleeve 313 can fixedly connect with the coupling nut 312 so that the transmission sleeve 313 and coupling nut 312 rotate as a unit. For example, as shown, the transmission sleeve 313 can include keyways 390 that receive corresponding keys 392 of the coupling nut 312. In some variants, the transmission sleeve 313 has the keys and the coupling nut 312 has the keyways. In further implementations, the coupling nut 312 and transmission sleeve 313 are threadably connected.

The coupling 300 can include a biasing member 318, such as a spring. The biasing member 318 can bias the transmission sleeve 313. The biasing member 318 can be longitudinally compressed between the coupling nut 312 and the transmission sleeve 313. In some embodiments, the biasing member 318 applies a preload of at least about 222 N (50 pounds) of force to the coupling nut 312 and/or the transmission sleeve 313. In certain variants, the coefficient of friction between the biasing member 318 and the coupling nut 312 and/or the transmission sleeve 313 is at least about 4.0. As illustrated, in some implementations, the transmission sleeve 313 and/or the biasing member 318 are received in a channel in the coupling nut 312.

In some embodiments, the coupling 300 includes a regulator, such as a friction disk 370. As illustrated, the friction disk 370 can be positioned longitudinally between the coupling nut 312 and the coupling sleeve 314. In some embodiments, the biasing member 318 presses the transmission sleeve 313 against the friction disk 370 and/or presses the friction disk 370 against the coupling sleeve 314. The friction disk 370 can be configured to fixedly connect with the transmission sleeve 313, such that transmission sleeve 313 and friction disk 370 rotate as a unit. For example, the first engagement features 385 can comprise connecting features, such as pins 385, that are received in corresponding features, such as openings 387, in the transmission sleeve 313. The pins 385 can be press-fit in the openings 387. In certain embodiments, the friction disk 370 is made of a metal, such as stainless steel (e.g., 300 Series), beryllium copper, or other metals. In some variants, the friction disk 370 is made of a plastic. In some implementations, the friction disk 370 is made of material with high abrasive resistance, high formability, and/or low magnetic permeability.

The friction disk 370 can be configured to fixedly connect with the coupling sleeve 314 up to a torque limit, as discussed in more detail below. As shown, the friction disk 370 can include torque regulating engagement features 388 that engage with corresponding features 386 of the coupling sleeve 314. For example, as illustrated, the friction disk 370 can include engagement heads 388 that are received in corresponding recesses or holes 386 of the coupling sleeve 314. In some variants, the torque regulating engagement features 388 of the friction disk 370 comprise recesses or holes and the mating features 386 of the coupling sleeve 314 comprise protruding heads. In certain embodiments, the features 386, 388 both respectively protrude from the coupling sleeve 314 and the friction disk 370, such as being sets of mating teeth.

The friction disk 370 can be configured to provide a certain amount of frictional resistance with the coupling sleeve 314 against relative rotation. In several embodiments, the engagement heads 388 and/or the recesses or holes 386 comprise cammed surfaces, such as being triangular in shape from a side view. In some such variants, the steeper the angle of the cammed surfaces, the greater the frictional resistance between the coupling sleeve 314 and the friction disk 370. In certain implementations, the engagement heads 388 have a substantially half dome shape, such as about a quarter of a sphere. In some embodiments, the friction disk 370 has a coefficient of friction of greater than or equal to 1, such as a coefficient of friction of at least 4. The coefficient of friction can be adjusted based on the construction of the friction disk 370 and/or the coupling sleeve 314, such as based on the shapes of the engagement heads 388 and the mating recesses or holes 386.

During engagement of the coupling 300 with a mating connector, the user can rotate the coupling sleeve 314, such as in a clockwise direction. The rotation of the coupling sleeve 314 can be transferred to the friction disk 370, which in turn can transfer the rotation to the transmission sleeve 313 and then simultaneously rotate the coupling nut 312. For example, rotation can be transferred to the coupling nut 312 and transmission sleeve 313 and friction disk 370 via the frictional engagement between engagement heads 385 of the friction disk 370 and the recesses or holes 386 of the coupling sleeve 314.

As the coupling 300 is progressively tightened against the mating connector, the torque required to further tighten the coupling 300 increases. Eventually, the torque reaches a limit amount that overcomes the frictional engagement between the engagement heads 388 of the friction disk 370 and the recesses or holes 386 of the coupling sleeve 314. When this occurs, the engagement heads 388 can move (e.g., slide) out of engagement with the recesses or holes. For example, the cammed surface of the features 388 can move along (e.g., ride up and fall down) a portion of the corresponding features 386. In the embodiment illustrated, this can allow the engagement heads 388 of the friction disk 370 to disengage from the recesses or holes 386 of the coupling sleeve 314, thereby enabling the friction disk 370 and coupling sleeve 314 to rotate relative to each other. Thus, the rotation of the coupling sleeve 314 is no longer transferred to the coupling nut 312 via the transmission sleeve 313. This can inhibit further torque transmission to the transmission sleeve 313 and the coupling nut 312 and/or can limit the amount of torque a user can apply to the coupling nut 312. In various embodiments, when the friction disk 370 rotates relative to the coupling sleeve 314, the friction disk 370 moves longitudinally and/or the keys 392 slide longitudinally along the keyways 390. In some implementations, the torque limit is greater than or equal to about 11.3 N*m (100 in*lbs).

During disengagement of the coupling 300 with a mating connector, the user can rotate the coupling sleeve 314, such as in a counter-clockwise direction. The rotation of the coupling sleeve 314 can be transferred to the friction disk 370, which in turn can transfer the rotation to the coupling nut 312 via the transmission sleeve 313. In some embodiments, during disengagement, non-cammed surfaces of the engagement heads 388 and/or the recesses or holes 386 abut. For example, a generally vertical portion of the half dome shape of the engagement heads 388 can engage with a corresponding portion of the recesses or holes 386. The coupling 300 can be configured to allow more torque to be applied in the loosening (e.g., counter-clockwise) direction than in the tightening (e.g., clockwise) direction. In some embodiments, the engagement heads 388 do not substantially move relative to (e.g., slide against) the recesses or holes 386 during disengagement of the coupling 300. In certain implementations, the coupling 300 can be engaged and disengaged without the need to longitudinally move the coupling sleeve 314 relative to the coupling nut 312.

As illustrated, some embodiments include both the teeth 364 and the friction disk 370. In certain implementations, during an engagement operation, the torque limit for the frictional engagement between the friction disk 370 and the coupling nut 312 via transmission sleeve 313 and/or coupling sleeve 314 is greater than or equal to the torque limit for the frictional engagement between the engagement heads 385 and the holes 386. In some variants, during an engagement operation, the torque limit for the frictional engagement between the friction disk 370 and the coupling nut 312 via transmission sleeve 313 and/or coupling sleeve 314 is less than the torque limit for the frictional engagement between the engagement heads 385 and the holes 386.

The coupling 300 can be configured to reduce the chance of unintentional disconnection of the coupling with one or both of the mating connectors. Unintentional disconnection can be a concern, for example, in environments in which the coupling 300 is subjected to vibrations and/or shock, such as in certain aerospace and other applications. Certain embodiments include an anti-rotation assembly, which can include a ratcheting member 320. The ratcheting member 320 can include engagement features, such as teeth 364. The teeth 364 can extend proximally and/or can be on a distal-facing surface of the ratcheting member 320. The teeth 364 can include a cammed surface. The cammed surface can be at an angle of at least about: 20°, 30°, 40°, 50°, 60°, 70°, angles between the aforementioned angles, or other angles. As shown, the teeth 364 can have a shape that is like a sawtooth wave.

In some embodiments, the ratcheting member 320 includes an alignment feature, such as a radially inwardly extending tooth 366. The alignment feature can be configured to matingly engage with a corresponding alignment feature of the barrel 310. For example, the tooth 366 can be received in a keyway, such as a track 328, of the barrel 310. In various embodiments, the barrel 310 and the ratcheting member 320 are connected so as to rotate as a unit.

In various embodiments, the coupling 300 includes one or more biased engagement units. For example, as illustrated, the biased engagement units can comprise one or more engagement heads 380 biased by springs 382. In some embodiments, the engagement heads 380 comprise generally spherical members, such as ball bearings. The coupling nut 312 can include recesses 384 that receive some or all of the springs 382 and/or the engagement heads 380. The engagement heads 380 can engage with the teeth 364 of the ratcheting member 320. For example, the engagement heads 380 can abut against the teeth 364. The springs 382 can bias the engagement heads 380 against the teeth 364, thereby increasing the frictional engagement between the engagement heads 380 and the teeth 364. The engagement between the biased heads 380 and the teeth 364 can inhibit or prevent the coupling nut 312 from rotating relative to the ratcheting member 320 and the barrel 310, such as might otherwise occur in response to vibrations and/or shock.

IV. Certain Terminology

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees, and the term "generally perpendicular" can refer to something that departs from exactly perpendicular by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

V. Summary

Various embodiments of couplings have been described above. However, this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of the coupling. Any component or feature disclosed in any embodiment in this disclosure can be used in other embodiments. For example, any of the features described in connection with the coupling 100 can be used in the coupling 200 or the coupling 300, any of the features described in connection with the coupling 200 can be used in the coupling 100 or the coupling 300, and any of the features described in connection with the coupling 300 can be used in the coupling 100 or the coupling 200. The scope of this disclosure should not be limited by the particular disclosed embodiments described above. For example, as mentioned above, although several embodiments have been disclosed in connection with a coupling, the inventions can be also incorporated in other connection devices, such as a connector that engages with a mating connector to provide communication between two cables. As an example of this, in some embodiments, the distal end of the barrel 110 can be configured to receive a portion of the cable and/or does not include the threads 128.

Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying drawings. The figures are drawn to scale, but such scale should not be interpreted to be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of couplings have been disclosed. Although the couplings have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described above, but should be determined only by a fair reading of the claims that follow.

The following is claimed:

1. A coupling configured to engage with a mating connector, the coupling comprising:
   a barrel;
   a coupling nut positioned radially outward of the barrel, the coupling nut comprising threads that are configured to engage with mating threads of the mating connector;
   a coupling sleeve positioned radially outward of the coupling nut, the coupling sleeve configured to rotate relative to the barrel in response to an applied torque;
   a first clicker member comprising a first plurality of teeth, the first clicker member connected with the coupling sleeve such that the first clicker member and the coupling sleeve rotate as a first unit;
   a second clicker member comprising a second plurality of teeth that are engaged with the first plurality of teeth, the second clicker member connected with the coupling nut such that the second clicker member and the coupling nut rotate as a second unit;
   wherein, when the applied torque is less than a limit amount, the first unit and the second unit rotate together relative to the barrel; and
   wherein, when the applied torque is greater than or equal to the limit amount, the first unit rotates relative to the second unit and to the barrel, and the first plurality of teeth slide along the second plurality of teeth, thereby emitting an audible clicking sound;
   wherein the second clicker member comprises a plurality of engagement features that are configured to engage with the coupling nut.

2. The coupling of claim 1, further comprising a biasing member that biases the second clicker member against the first clicker member.

3. The coupling of claim 1, further comprising a friction disk.

4. The coupling of claim 3, wherein the friction disk is disposed about the coupling nut.

5. The coupling of claim 1, wherein the first clicker member and the second clicker member are identical.

6. The coupling of claim 1, wherein the second clicker member is disposed about the coupling nut.

7. The coupling of claim 1, wherein the first plurality of teeth are located on a first side of the first clicker member and the plurality of engagement features are located on a second side of the first clicker member.

8. The coupling of claim 7, wherein the coupling sleeve comprises a plurality of engagement projections configured to engage with the plurality of engagement features on the second side of the first clicker member.

9. The coupling of claim 1, wherein the second plurality of teeth are located on a first side of the second clicker member and the plurality of engagement features are located on a second side of the second clicker member.

10. The coupling of claim 9, wherein the coupling nut comprises a plurality of projections configured to engage with the plurality of engagement features on the second side of the second clicker member.

11. The coupling of claim 10, wherein the plurality of projections are disposed on an outside surface of the coupling nut.

12. The coupling of claim 1, wherein the first plurality of teeth includes a cammed surface positioned at an angle, wherein the angle is at least 20°.

13. The coupling of claim 12, wherein the angle of the first plurality of teeth is between about 20° and 70°.

14. The coupling of claim 1, wherein the second plurality of teeth includes a cammed surface positioned at an angle, wherein the angle is at least 20°.

15. The coupling of claim 14, wherein the angle of the second plurality of teeth is between about 20° and 70°.

16. A coupling configured to engage with a mating connector, the coupling comprising:
   a barrel;
   a coupling nut positioned radially outward of the barrel, the coupling nut comprising threads that are configured to engage with mating threads of the mating connector;
   a coupling sleeve positioned radially outward of the coupling nut, the coupling sleeve configured to rotate relative to the barrel in response to an applied torque;
   a first clicker member comprising a first plurality of teeth, the first clicker member connected with the coupling sleeve such that the first clicker member and the coupling sleeve rotate as a first unit;
   a second clicker member comprising a second plurality of teeth that are engaged with the first plurality of teeth, the second clicker member connected with the coupling nut such that the second clicker member and the coupling nut rotate as a second unit;
   wherein, when the applied torque is less than a limit amount, the first unit and the second unit rotate together relative to the barrel; and
   wherein, when the applied torque is greater than or equal to the limit amount, the first unit rotates relative to the second unit and to the barrel, and the first plurality of teeth slide along the second plurality of teeth, thereby emitting an audible clicking sound;
   wherein the first clicker member and the second clicker member are positioned radially between the coupling nut and the coupling sleeve.

* * * * *